Patented June 2, 1942

2,285,065

UNITED STATES PATENT OFFICE 2,285,065

PROCESS OF MAKING EDIBLE BAKED PRODUCTS

Walter A. Taylor, Tamaqua, Pa., assignor to Atlas Powder Company, Wilmington, Del., a corporation of Delaware No Drawing. Application December 17, 1938, Serial No. 246,250

4 Claims. (Cl. 99—90)

This invention relates to a new and improved composition of matter for use in the preparation of edible baked goods and to a new and improved edible, baked, farinaceous product made therefrom.

It is well known that the palatableness of baked products is impaired by the staling of such products, and for many years bakers, in their efforts to place baked products in the hands of the consumer before loss of freshness occurred, have used extreme care in the handling of the baked goods. Thus, it has been proposed to control the humidity of the atmosphere to which the freshly baked products may be exposed in the bakery. Also, many improvements have been directed toward the provision of sealed wrappers for freshly baked products. While quite effective throughout the time required for delivery of the baked goods, such measures fail to solve the consumer's problem of loss in freshness, particularly where the baked product is used by small families which may require several days for consumption of the product. In recent years, the prevalence of ready sliced loaves of bread has aggravated the difficulties encountered in the prevention of staleness, since the ready sliced loaves have the crust cut so that the crumb (interior of the loaf as distinguished from the crust) has a greater degree of exposure to the surrounding atmosphere.

The staling of cake is also a problem to the cake baker and merchandiser. In general, on account of more infrequent deliveries, the average age of cake reaching the consumer is greater than that of bread. It is therefore imperative for the cake baker to take steps to prevent the staling of his product. Progress has been made in this direction. In addition to packaging his product in moistureproof wrappers, the baker has increased the sugar content of his cakes since it is known that sugar will retain freshness to a certain extent. When increasing the sugar content in his formula, the baker, of course, must resort to the use of "high ratio shortening," otherwise his product will be "sad." Although increasing the sugar has been beneficial to a certain degree in retaining freshness, still the baker is troubled with the staling of his product.

An object of the present invention is the provision of an edible, baked, farinaceous product having improved keeping qualities and increased resistance to staleness.

Another object of the invention is the prevention of loss of moisture from baked products.

A further object of the invention is the provision of a bread which, after drying, has a more plastic crust and a softer texture.

A still further object of the invention is the retention of the original starch-gluten-moisture equilibrium in bread upon storage thereof.

A further object of the invention is to provide a cake which has improved keeping qualities and increased resistance to staleness.

Other objects of the invention will hereinafter more fully appear.

The general opinion is that staling of all baked products is primarily due to the loss of moisture therefrom during the period of time between baking and use. With respect to bread, some investigators have given very different reasons for staling, namely, that the growing stale of bread is not due to desiccation but to changes in the physical state of the starch. This latter explanation advances the idea that "a retrogration" of starch occurs in bread similar to that which takes place in concentrated starch paste, and that stale bread contains less soluble starch and the moisture set free by the starch changes the distribution of water in the loaf. This results in giving the crumb a texture and hardness known as staleness.

In accordance with the present invention, sorbitol, preferably in the form of a syrup, is incorporated into the dough or batter from which the baked product is to be made. After the baking, the sorbitol at least partially prevents loss of moisture, and as a result the baked product has, after storage, substantially less loss in weight than similar baked products without the sorbitol. In breads, the sorbitol tends to retain the original starch-gluten-moisture equilibrium, and bread with sorbitol incorporated therein is softer and more plastic after storage than untreated bread.

For purposes of illustration, the invention is described as employed with a conventional 63% water absorption formula for bread which is as follows:

| Sponge | Ingredients | Dough |
|---|---|---|
| 18 lbs. | Flour | 12 lbs. |
| 10 lbs. | Water | 9 lbs. |
| 14½ oz. | Shortening | |
| 2½ oz. | Salt | |
| | Sugar | 8½ oz. |
| 2¼ oz. | Malt | 1 lb. 13 oz. |
| 8½ oz. | Yeast | |
| 2½ oz. | Yeast food | |
| | Milk powder | 14½ oz. |
| | Paniplus | 1 oz. |
| Total 29 lbs. 14½ oz. | | Total 24 lbs. 5 oz. |

In the preparation of the bread, the "sponge" ingredients were mixed for 5 minutes and then placed in a fermentation room for 4 hours and 15 minutes. After fermentation the sponge was placed in a mixer and the ingredients for the preparation of the dough added, including a small percentage of sorbitol syrup not shown in the above formula. The dough was mixed for about 8 minutes and then cut and shaped into the size of loaves. After properly rising, the loaves were baked for 28 minutes at a temperature of about 390° F.

Loaves with 0.0, 0.5, 1.0, 2.0 and 3.0% sorbitol were allowed to remain on racks for three days and loss in weight of the respective loaves then determined. In the following table the average loss in weight of an average of about ten of each of various types of loaves is shown:

| Type of loaf | Size | Loss in weight in grams after 3 days | | | |
|---|---|---|---|---|---|
| | | 0% sorbitol | 0.5% sorbitol | 1.0% sorbitol | 3.0% sorbitol |
| | Oz. | Gms. | Gms. | Gms. | Gms. |
| Uncut—unwrapped | 18 | 47.1 | 40.9 | 40.9 | 36.2 |
| Uncut—wrapped | 22 | 10.8 | 9.1 | 6.9 | 4.4 |
| Sliced—wrapped | 18 | 6.9 | 5.0 | 4.8 | 5.0 |

After this three-day storage period, the loaves containing sorbitol felt much fresher to the touch than did the loaves containing no sorbitol. Likewise, the bread containing sorbitol was much fresher to the taste than the bread containing no sorbitol. The crust and crumb of the loaves containing sorbitol were softer and more plastic than that of the loaves containing no sorbitol. This increased plasticity appeared to be due to a plasticizing action exerted by the sorbitol on the starch-gluten-moisture composition, as well as to retention of moisture in the loaf. This condition is very desirable because customers oftentimes appraise the freshness of bread by its feel or softness.

The addition of sorbitol in the above proportions to the dough did not materially affect the consistency of the dough nor did it show any effect on the color, grain, size or evenness of bake of the crust or crumb. Aside from the improved odor and taste of freshness in the stored loaves, the sorbitol imparted no odor or taste to the bread.

The following non-limiting example illustrates how I may incorporate sorbitol in cake:

*Chocolate layer cake*

| Ingredients | Weight in grams | Mixing stage |
|---|---|---|
| Flour | 226.4 | I |
| Shortening | 124.56 | I |
| Chocolate | 83.0 | I |
| Sugar granulated | 368.0 | II |
| Salt | 10.6 | II |
| Baking soda | 3.52 | II |
| Baking powder | 10.6 | II |
| Eggs | 215.2 | III |
| Milk | 199.8 | III |
| Vanilla flavor | 10.0 | III |

Three mixing or creaming stages, as indicated above, were used in preparing cake batter by the above formula. Each stage of mixing required 5 minutes time.

The method of adding ingredients in the first stage was to cream the shortening and flour first and then add the chocolate which had been warmed and melted. In the second and third stages respectively, the ingredients were all added at the same time. In the cases where sorbitol was used, the sorbitol was added along with the ingredients in the third stage. The sorbitol was added in the form of a syrup. The batter was placed in pans 8" in diameter—285 g. of batter per pan. The cakes were baked at 375° F. for 20 minutes.

Cakes containing 0, 1, 2 and 4% sorbitol were allowed to remain on racks for 3 days and loss in weight of the respective cakes was determined. The following table shows the average loss in weight of cakes containing no sorbitol and 1, 2 and 4% sorbitol.

| | Cakes containing— | | | |
|---|---|---|---|---|
| | 0% sorbitol | 1% sorbitol | 2% sorbitol | 4% sorbitol |
| | Grams | Grams | Grams | Grams |
| Loss in weight after 1 day | 17.0 | 10.7 | 9.5 | 7.8 |
| Loss in weight after 2 days | 20.1 | 13.5 | 12.7 | 10.0 |
| Loss in weight after 3 days | 24.0 | 17.7 | 17.7 | 15.1 |

In addition to sorbitol retarding the loss of moisture, it was observed that the cakes containing sorbitol retained a softer texture and crumb than did the cake containing no sorbitol.

The sorbitol employed in the preparation of the dough or batter and baked product of the present invention may be a pure product or else the technical mixture obtained by the alkaline reduction of glucose. This latter mixture consists of sorbitol with minor amounts of other polyhydric bodies. Preferably, the sorbitol is employed in the form of a sorbitol syrup which may be readily incorporated into the dough.

While for purposes of illustration the invention has been particularly described with reference to the preparation of bread and cake, it is to be understood that the invention is applicable to bakers' products other than bread and cake, as for example, baked sweet doughs, baked pastries, etc., wherein baking powder or the like is used instead of yeast for aerating the goods. Bread embodying the present invention need not be prepared by the "sponge" method, as "straight" dough or other methods may be employed as desired, it only being necessary that the sorbitol or sorbitol syrup be incorporated into the dough sometime prior to the baking. The sorbitol may be employed in greater or less amounts than the percentages set forth in the foregoing examples, the softness and moisture retention properties of the baked product generally increasing as the percentage of sorbitol is increased. High ratio shortenings need not be employed in the practice of my invention. By the use of sorbitol I may employ regular shortening with its attendant lower amount of sugar and obtain cakes with much improved keeping qualities. Other modifications will be apparent to those skilled in the art.

Having described the invention, what I claim is as follows:

1. In the preparation of dough for use in the baking of bread and having flour and water as the principal ingredients, the steps comprising preparing a sponge and admixing the sponge with the balance of the flour, water and other ingredients while incorporating therein sorbitol in a proportion sufficient to inhibit substantially the tendency of the bread to become stale on storage after baking but insufficient to alter the normal taste of the bread.

2. A process of preparing dough for use in the baking of bread and having flour and water as the principal ingredients, which includes the steps comprising preparing a sponge and admixing the sponge with the balance of the flour, water and other ingredients, while incorporating therein an amount of sorbitol sufficient to inhibit substantially the tendency of the products to become stale on storage after baking but insufficient to alter the normal taste of the products, this amount lying between a lower limit of about 0.5% and an upper limit not exceeding about 4% by weight of the dough composition.

3. A process of preparing bread having flour and water as the principal ingredients comprising the steps of preparing a dough of flour, water, yeast and other bread ingredients and incorporating therein sorbitol in a proportion sufficient to inhibit substantially the tendency of the bread to become stale on storage after baking but insufficient to alter the normal taste of the bread, allowing the dough to rise, and baking the risen dough.

4. A process as in claim 3 wherein the sorbitol is employed in an amount lying between a lower limit of about 0.5% and an upper limit not exceeding about 4% by weight of the dough composition.

WALTER A. TAYLOR.